(12) United States Patent
Shubrook

(10) Patent No.: US 11,811,945 B2
(45) Date of Patent: Nov. 7, 2023

(54) BLOCKCHAIN IDENTITIES

(71) Applicant: TOLLEN SOFTWARE LIMITED, Sevenoaks (GB)

(72) Inventor: Jason Shubrook, Sevenoaks (GB)

(73) Assignee: TOLLEN SOFTWARE LIMITED, Sevenoaks (GB)

( * ) Notice: Subject to any disclaimer, the term of this patent is extended or adjusted under 35 U.S.C. 154(b) by 0 days.

(21) Appl. No.: 17/442,958

(22) PCT Filed: Mar. 26, 2020

(86) PCT No.: PCT/EP2020/058585
§ 371 (c)(1),
(2) Date: Sep. 24, 2021

(87) PCT Pub. No.: WO2020/201024
PCT Pub. Date: Oct. 8, 2020

(65) Prior Publication Data
US 2022/0103366 A1   Mar. 31, 2022

(30) Foreign Application Priority Data

Mar. 29, 2019 (GB) .................................. 1904415

(51) Int. Cl.
| | |
|---|---|
| *H04L 29/06* | (2006.01) |
| *H04L 9/32* | (2006.01) |
| *H04L 9/30* | (2006.01) |
| *G06Q 20/38* | (2012.01) |
| *H04L 9/00* | (2022.01) |

(52) U.S. Cl.
CPC .............. *H04L 9/3239* (2013.01); *H04L 9/30* (2013.01); *H04L 9/3247* (2013.01); *G06Q 20/389* (2013.01); *H04L 9/50* (2022.05)

(58) Field of Classification Search
CPC ......... H04L 9/323; H04L 9/30; H04L 9/3247; H04L 2209/38; G06Q 20/389
See application file for complete search history.

(56) References Cited

U.S. PATENT DOCUMENTS

| | | | |
|---|---|---|---|
| 10,102,526 B1* | 10/2018 | Madisetti | ............. G06Q 20/389 |
| 2016/0300222 A1* | 10/2016 | Yang | ................... G06Q 20/383 |
| 2017/0124535 A1 | 5/2017 | Juels et al. | |
| 2017/0344988 A1* | 11/2017 | Cusden | ................... H04L 63/12 |
| 2017/0352031 A1* | 12/2017 | Collin | .................... G06Q 20/38 |

(Continued)

FOREIGN PATENT DOCUMENTS

AU    2018101669 A4    12/2018

OTHER PUBLICATIONS

International Search Report and Written Opinion received in PCT/EP2020/058585 dated Sep. 14, 2019, pp. 13.

*Primary Examiner* — Joseph P Hirl
*Assistant Examiner* — Leynna Truvan
(74) *Attorney, Agent, or Firm* — Liang & Hennessey LLP; Brian Hennessey

(57) ABSTRACT

The invention is directed to computer-based method and a computer system for generating a blockchain address. The method comprises receiving a request for a new blockchain address for a user, the request including a public key, which has an associated private key, and identification information for the user, and generating the address based on a combination of the public key and the identification information.

7 Claims, 7 Drawing Sheets

| Version No | . | Public Key | . | Doc Type | KYC Hash | . | Checksum |
|---|---|---|---|---|---|---|---|
| | | | | | | | |

(56) References Cited

U.S. PATENT DOCUMENTS

| | | | |
|---|---|---|---|
| 2018/0117446 A1* | 5/2018 | Tran | G06Q 20/389 |
| 2018/0240107 A1* | 8/2018 | Andrade | G06Q 20/36 |
| 2019/0019144 A1* | 1/2019 | Gillen | H04L 9/3213 |

* cited by examiner

| Version No | . | Public Key | . | Doc Type | KYC Hash | . | Checksum |
|---|---|---|---|---|---|---|---|
| | | | | | | | |

```
<Form id="KYC_Form1">
    <Name> Mike Smith </Name>
    <PassportNumber> 123456789 </PassportNumber>
    <CountryOfResidence> UK </CountryOfResidence>
    ...
    Additional Information
    ...
    <Salt> 12-34-56 </Salt>
</Form>
```

BLOCKCHAIN IDENTITIES

CROSS-REFERENCE TO RELATED APPLICATIONS

The present application is a national phase application of PCT Application No. PCT/EP2020/058585, filed Mar. 26, 2020, entitled "BLOCKCHAIN IDENTITIES", which claims the benefit of Great Britain Patent Application No. 1904415.5, filed Mar. 29, 2019, each of which is incorporated by reference in its entirety.

TECHNICAL FIELD

The present invention relates generally to methods and systems for associating a real identity with a user of a distributed digital ledger, specifically a blockchain.

BACKGROUND

Blockchains are decentralized, distributed digital ledgers formed by strings of blocks that are used to record transactions. The blockchain is typically distributed across a very large number of networked computers (often referred to as "nodes"), with a copy of the entire digital ledger held at each node. Transactions are added to the blockchain sequentially in the blocks, each block including one or more timestamped transactions. Each block includes a cryptographic hash (i.e. a unique identifier) and also includes a copy of the cryptographic hash of the prior block in the blockchain, linking the blocks in sequence and thus protecting the blocks, and hence the underlying transactions, against tampering and revisions.

Blockchain networks can be permissioned or permissionless. Permissioned ("private") blockchains have an access control layer to govern who has access to the blockchain network. They are typically controlled by a single organization or, in some cases, a consortium of organisations. Permissionless (or "open"/"public") blockchain networks have no access control. In this sense they are "trust-less" peer-to-peer systems, i.e. no user is trusted more than any other, that permit transactions to be executed without the need for a trusted third party.

Blocks are only added to the replicated ledgers once the block has been validated. The blocks are typically validated based on a consensus being reached by multiple nodes in the blockchain network. One commonly used consensus mechanism that is used for public blockchains is "proof of work", used for example with Bitcoin (a well-known cryptocurrency using a public blockchain network for its transactions), where "miners" in the blockchain network solve cryptographic puzzles to add a block to the blockchain. When a miner solves the puzzle they then present the block to the network for verification after which it is added to the end of the chain in each copy of the distributed ledger. Private blockchain networks also generally use consensus mechanisms for validating blocks but because the participants are known and trusted the mechanisms used can be computationally simple, for example "multi-signature" where a simple majority of designated validator nodes agree that a transaction/block is valid.

Blockchain is best known for its use in cryptocurrency transactions, although there are an increasing number of other uses emerging, including healthcare records, online voting, tracking of assets in a supply chain, etc.

In cryptocurrency systems and other systems involving transactions that record the transfer of an asset (virtual or otherwise) from one party to another, a mechanism is required for identifying the party to whom the asset is to be transferred. This is achieved in blockchain networks using blockchain addresses; a unique identifier. One example of a blockchain address is a hash of the user's public key (i.e. the public key of a cryptographic public-private key pair generated with an asymmetric key algorithm). Assets can be held against the blockchain address (in this sense, in the case of a cryptocurrency, the address can be considered synonymous with an account number) and the holder of the private key for the address can sign transactions for that address and anyone who knows the address can verify the signature without discovering the private key. Typically as user will have multiple blockchain addresses, each with its own public-private key pair, held in a virtual container (often referred to as a "wallet"). In Bitcoin, for example, it is normal for a recipient of bitcoins to use a new address for each transaction.

To complete a transaction transferring an asset (e.g. a specified amount of a cryptocurrency) from a sending party to a receiving party, the receiving party provides their blockchain address to the sending party (if they do not already have it), the sending party then creates a transaction including the receiving party's blockchain address and the asset to be transferred and then signs the transaction with the private key associated with the sender's blockchain address from which the asset is being transferred. The transaction is then broadcast to the blockchain, along with the sending party's public key (associated with the sender's blockchain address), so that the signature on the transaction can be verified. The transaction is then added to a block and, once validated, appended to the end of the blockchain. At this point the transaction can be considered executed and the asset is now recorded against the receiving party's blockchain address and no longer available at the sending party's blockchain address.

Another recognized benefit of blockchains is that the users of the system can remain anonymous. That is, a transaction is completed by transferring an asset to a specific, known blockchain address but in executing the transaction there is no requirement, or ability, to know the true identity of the user who controls that address. Whilst this is undoubtedly a benefit in some cases, it is also one of the problems that is preventing wider spread adoption of blockchain, especially public blockchain networks, in regulated environments, where a party such as a bank will insist on knowing the true identity of a party before transacting with them. This can cause problems, for example, when users wish to convert between cryptocurrencies and FIAT currencies as well as in the execution of other financial transactions.

The inability to know the true identity of the owner of a blockchain address also leads to other issues. For instance, anyone who holds the private key has full unrestricted access to the contents of the address. If the key is lost, the owner has no way of regaining control of the assets (because they have no way of demonstrating that they are the true owner). Similarly, if the key is stolen and used to transfer assets away from the account, there is no recourse for the actual owner. It also means that inheritance of assets cannot occur without the beneficiaries (or executors of an estate) having access to the private keys associated with the blockchain addresses.

SUMMARY

In general, embodiments of the present invention are concerned with addressing at least some of the problems discussed above by providing a mechanism by which the true owner of a blockchain address (i.e. an "account" owner) can be identified. This is achieved by embedding owner identification information within the blockchain address itself.

In this way it remains possible to retain the peer-to-peer capabilities of a trust-less blockchain system, there still being no central authority required for validating transactions, whilst enabling the true identity of an address owner to be checked when necessary.

In some embodiments, owner identification information is itself encrypted before it is embedded in the blockchain address. In this way, the owner can control which other parties have access to this information and can remain anonymous to other parties.

By embedding the owner identification information in the blockchain address it also reduces the dependency on the private key as the only way of identifying the owner of assets held against the blockchain address.

In some embodiments, the embedded owner identification information is authenticated by a trusted party, referred to in the following as a "Guardian". The Guardian may, for example, digitally sign the blockchain address once they have confirmed the authenticity of the owner identification information. Third parties can then trust the embedded owner identification information when they see that the address has been validly signed by a Guardian.

In some embodiments, the Guardians can also be permitted to carry out other 'trust' based operations to facilitate a wider range of transaction on the blockchain and/or to police the blockchain.

In some embodiments, blockchain systems are proposed that use Guardians (i.e. trusted users) to carry out specific operations without necessarily using blockchain addresses having embedded owner identification information.

DETAILED DESCRIPTION OF EMBODIMENTS

Various embodiments now will be described. The various embodiments may be methods, systems, media, or devices and may, for example, take the form of an entirely hardware embodiment, an entirely software embodiment, or an embodiment combining software and hardware aspects.

Account Owner Identification

If an owner of an blockchain address can be identified, assuming they provide the authorization, then ownership can be irrefutably proved. To do this, in embodiments of present invention, the address (account) owner's identification details are embedded in the address itself at creation time. They are embedded in an encoded format so that the details remain anonymous until the owner decides to reveal them. The owner identification details are referred to in the following description as KYC ("know your customer") information but the concepts described herein are equally applicable to other types of user identification information that can be used to identify or confirm the real identity of a user of the blockchain.

Figures 1, 2, 3:
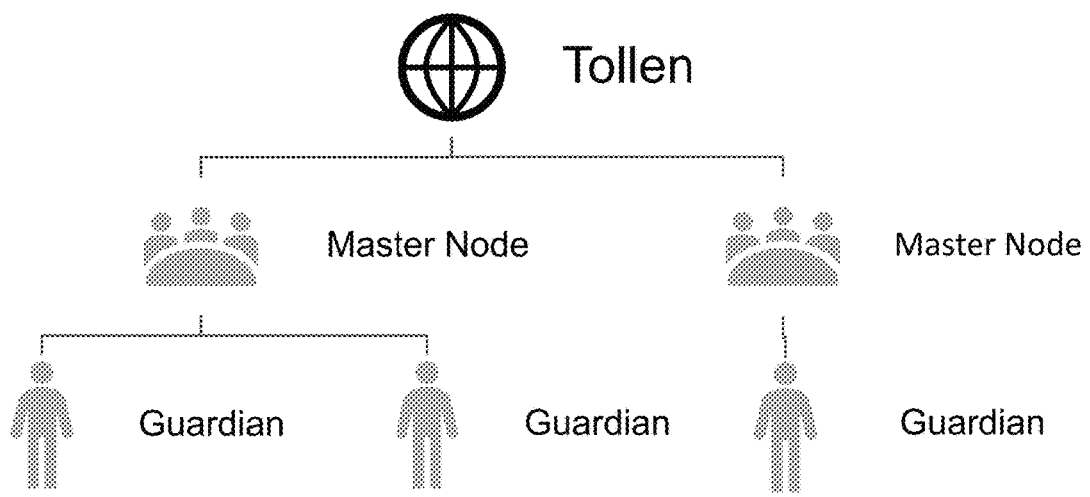
FIG. 1 is a diagram illustrating a blockchain address created in accordance with an embodiment of the present invention.
FIG. 2 schematically shows an example of a form for inputting owner identification information for an embodiment of the present invention.
FIG. 3 shows a hierarchical structure for certifying Guardians.

An exemplary format of an encoded address is shown in FIG. 1. The key components are as follows:

Version No—The address version no

Public Key—The hash of public key

Doc Type—The type of document used to generate the KYC hash

KYC Hash—The hash of the KYC information hashed with the public key hash

Checksum—A simple checksum to validate the overall address

In some embodiments, the KYC Hash is a cryptographic hash of the owner's KYC information merged together with the owner's public key hash. This creates a unique hash code that requires the public key and the correct KYC information to recreate.

In some embodiments, to ensure the KYC information is easily recreated when required, it is entered in a standard format (for example using a standard form provided in a user interface for interacting with the blockchain system). The standard format used will typically depend on the type of identity information that is being entered. This type is identified in this example by the Doc Type field. By using an appropriate form for data entry, which follows the standard format for the chosen type of identity information, a Guardian can enter a user's known information and, using the user's public key, exactly recreate the KYC Hash code (validation rules on the form can ensure that the formatting and layout do not change the hash code).

FIG. 2 shows, by way of example, one possible standard format of KYC information for a passport document type. In this example, the KYC document 'KYC_Form1' is being used to identify a user called 'Mike Smith'.

Salt Field

If a user creates a KYC hash from a standard form, then the hash will always be the same as their KYC information never changes. This would potentially allow anyone to search through the addresses on the blockchain (admittedly with effort as they have to calculate the final hash with the public key hash) and find all the addresses owned by an individual. While this is unlikely to allow them to do anything malicious, it does remove an element of anonymity from the system outside the control of the user.

To address this, some embodiments of the invention employ a salt field within the information used to create the KYC hash. Forms that contain a salt field introduce an extra element of randomness to the KYC hash, which is not hard to crack if you know the KYC information (i.e. you are verifying the KYC information and the salt code has been lost) but is incredibly hard if you are searching all addresses to find someone.

To illustrate this, it is useful to consider three cases:

1) Verifying KYC Information with a Valid Salt Field

In this case, the Guardian fills in the KYC form with all the user's details, including the salt code, and is able to verify that the KYC information matches.

2) Verifying KYC Information without a Valid Salt Code

In the case where a user has forgotten their salt code, a brute force attack can be used to work it out. The complexity of the attack is relatively small as the KYC information and the user's blockchain address are known, so the only variable is the possible salt values (1 million values in the illustrated example with 6 digits between 0 and 9).

3) Attempting to Find a Person's Address with Only KYC Details

This is the scenario that the salt field is designed to prevent. A person is attempting to find all addresses that belong to a specific user, but they don't know the address or the salt code. In this case, they would have to perform a brute force attack on every single address on the blockchain to find the accounts, which is not feasible.

Transaction Using Blockchain Address with Embedded KYC Information

By using a blockchain address in which the KYC information of the owner is embedded, a mechanism can be provided for enabling the parties to a transaction to verify that they are transferring an asset to the correct intended recipient.

Figures 4A, 4B:
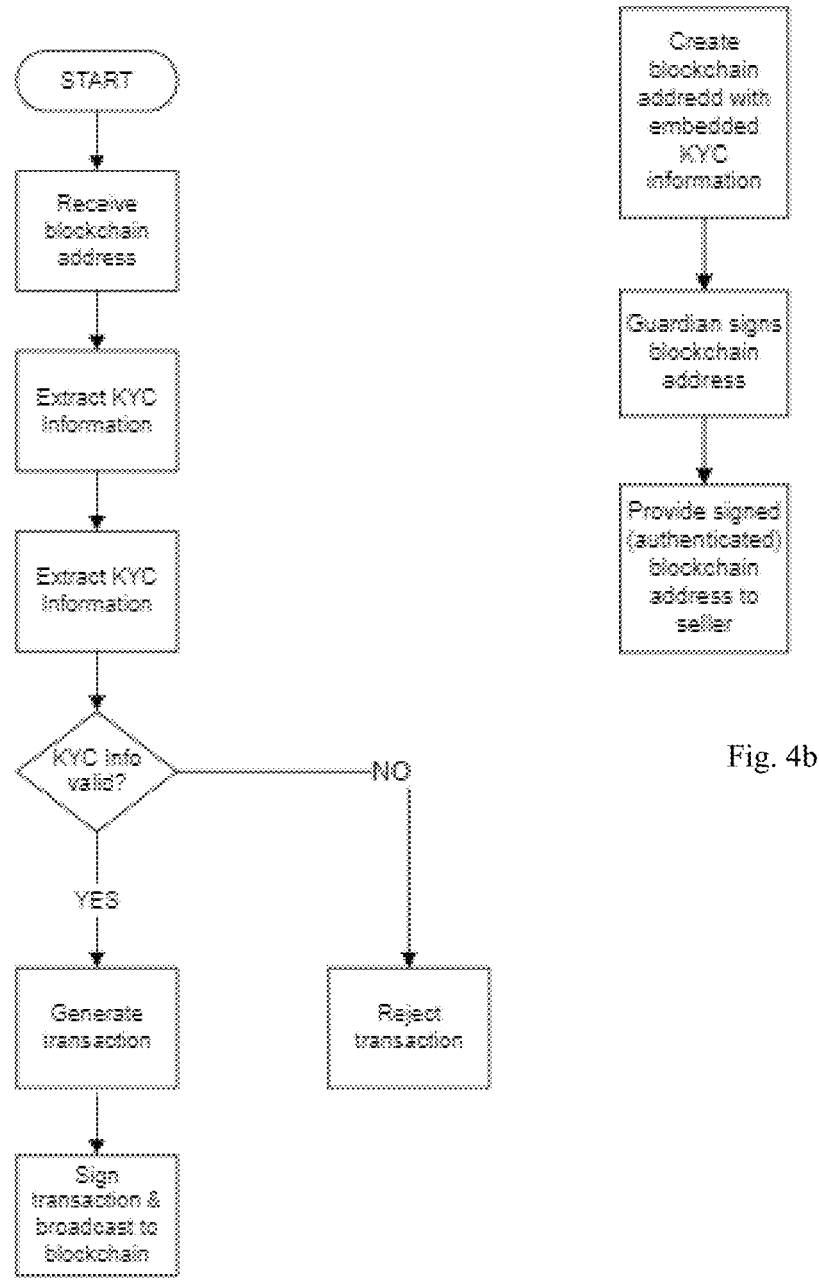
FIG. 4a is a flow chart showing a process for executing a transaction using a blockchain address in accordance with an embodiment of the invention.
FIG. 4b is a flow chart showing a process for generating an authenticated blockchain address with embedded KYC information.

FIG. 4a illustrates an example of executing a transaction to transfer an asset (e.g. a specified amount of a cryptocurrency) to a receiving party's blockchain address, including a step of validating that the owner of the blockchain address is the intended recipient.

As a first step, as in a known blockchain transaction, the receiving party provides their blockchain address to the sending party (if they do not already have it). However, whereas in a conventional blockchain transaction the sending party would simply proceed with the transaction using the received blockchain address, in this example of an embodiment of the present invention the sending party first verifies that the owner of the received blockchain address is in fact the intended party that they wish to transfer the asset to.

Thus, in a second step, the received blockchain address is decoded (as described above) to extract the KYC information from the received blockchain address. The KYC information can then be checked and if it is valid (i.e. if it confirms that the owner of the received address is the intended recipient of the asset being transferred) the transaction can proceed. Otherwise, the transaction is terminated.

In the case where the KYC information is valid, the transaction is then generated in a conventional manner, including the receiving party's blockchain address and the asset to be transferred. The transaction is then signed with the private key associated with the sender's blockchain address from which the asset is being transferred and broadcast to the blockchain, along with the sending party's public key (associated with the sender's blockchain address), so that the signature on the transaction can be verified.

The transaction process then continues in a conventional manner, with the transaction being added to a block and, once validated, appended to the end of the blockchain. At this point the transaction can be considered executed and the asset is now recorded against the receiving party's blockchain address and no longer available at the sending party's blockchain address.

Guardians

While current public blockchains work on a trustless system, there are invariably situations where arbitration is required. This is where Guardians come in as they re-introduce an element of 'trust' back into the system.

A Guardian can be defined as:

An individual or organization that has been certified as a 'trusted' user of the blockchain and, as such, can perform certain trusted operations on the blockchain The role of Guardians is to provide services to the blockchain that cannot be provided in a trustless system, although there is no requirement to use a Guardian at all. Each Guardian will have to be certified to be able to perform these operations and will be accountable for all the operations they perform.

The list of operations that Guardians can perform is large and permissions associated with each Guardian can be maintained to define a subset of operations from the entire list of possible operations that each Guardian can perform. By way of example only, the types of operations that a Guardian could perform include one or more of the following:

Authentication of Accounts

Authentication of the owner of an account, i.e. a specific blockchain address, (an authenticated account would be digitally signed by the Guardian) to provide assurances of the validity of the account.

Dispute Resolution

If a user loses control of their account (i.e. blockchain address) through e.g. loss or theft of their private key, then a Guardian will be able to authenticate that the user is indeed the owner of the account via account identification and then freeze/reverse transactions or move the assets to a new account for that user.

This is one of the major problems with existing blockchains and the introduction of a combination of account identification and Guardians provides a way around this.

Secure Accounts

Guardians can act as additional signatories for accounts. If a user has e.g. a savings account with a large number of assets stored in it, then additional signatures will provide extra security, especially as the Guardian will have their own security procedures to verify the transaction.

The above is just a small sample of the possible operations that Guardians could perform.

Blockchain Ecosystem

With the introduction of Guardians, the blockchain can be supported by a large number of organizations each of who can offer any number of services. An important point here is that a user of the blockchain can pick and choose which Guardians (if any) they wish to use for each service and can also change them over seamlessly. For example, a user may wish to use an accountancy firm to provide their identify verification (for regulation and tax purposes) but then choose a financial institution or insurance firm to provide multi-signature services on their savings accounts. If they wish to change these providers, they can simply switch over (a new Guardian would simply provide a new identity service and a simple digital signature would swap over the multi-signature on a savings account).

Becoming a Guardian

To be a Guardian, in some embodiments of the invention, it is expected that the following criteria should be met:

1) The Guardian must be certified (this is explained in the following section);

2) The Guardian must hold the minimum number of coins for the services they wish to provide;

3) Any additional checks/conditions that are stipulated for the services they apply for must have been passed; and
4) The terms and conditions for the services they are applying for must have been signed.

All Guardian's will be listed in a centrally accessible directory, for example on a website along with their information, client numbers and activity statistics. This website could also be used to search for Guardians that can perform specific roles and it is possible that we could create a marketplace for all the Guardians from this.

If at any point any of the points above cease to be valid, then the Guardianship will automatically be revoked.

Guardian Certification

New Guardians need to be certified by a Guardian who has the power of certification. Certification happens in a hierarchical structure, as shown in FIG. 3.

The monitoring of Guardian's is the primary responsibility of the parent Guardian, but they will also be monitored intermittently by other nodes.

Revenue

Revenue is generated by applying transaction fees to transactions that occur on the blockchain. With BitCoin, all transactions have a fee applied to them at a fixed percentage of the transaction amount (which makes the transaction costs very high with the rising price of BitCoin).

Instead of a flat fee, in some embodiments we propose to introduce a more flexible structure that can exempt certain transactions from fees and charge others at different rates (for example, fixed fees for certain transactions and a percentage for others. Sliding scales can be applied to each of these solutions depending on the overall transaction size)

Renumeration

An important part of the blockchain ecosystem of some embodiments is how does everyone get paid? An organization is unlikely to want to be part of any ecosystem unless there is something in it for them. In some embodiments it is proposed that the remuneration is to be derived from two sources:

1) Charges from the Guardian to the address owner themselves for services provided (this may be additional signatures or dispute resolution). These costs will be set by the Guardian themselves and will rely on market forces to settle the price (the marketplace website would allow Guardian's prices to be compared); and
2) Distribution of revenue from the operation of the blockchain itself (as described in the previous section).

One example of a possible revenue distribution model could include a predefined percentage of revenue being set aside for renumeration (e.g. 50%). This set-aside amount could be further divided into sub-blocks that are allocated based on performance.

The following table outlines an example:

| Block | Sub-Block | Allocation | Function |
|---|---|---|---|
| Coin Ownership | | 50% | Revenue allocated based on coin ownership |
| Operations | Mining | 25% | Revenue based on mining volume |
| | Monitoring | 25% | Revenue based on monitoring functions |

Guardian Use Cases

Authentication of KYC details

In some embodiments, the KYC identification process can be considered to have two steps: first, the embedding of the KYC information into the address; and second, having a trusted Guardian authenticate those KYC details as belonging to the individual. It is the second part that allows a third party to have confidence that the address they are sending assets two does indeed belong to the person they intended it to go too.

The following example, setting out a sequence of consecutive steps, illustrated in FIG. 4b, illustrates how this would work:

1) A person creates an address, potentially off-line, embedding their KYC details into the address;
2) At some future point, they wish to use this address to receive assets;
3) The seller of the assets wishes to authenticate the owner of the address is indeed the person that they think it is;
4) If they haven't already done so, the owner of the address can use a Guardian to authenticate the KYC details embedded in the address and confirm to the seller that they are indeed the owner of the address.

Multi-Signatures for an Address

In existing blockchain systems, the security around addresses has relied on the private key. If the key is lost or compromised, then the address is no longer secure.

By using multiple signatures on an account, one single private key is not enough to compromise an address; multiple private keys are required. In some embodiments, it is proposed that these additional keys are owned by a Guardian who will use their own methods of security to ensure that transactions are genuine.

Figure 5:
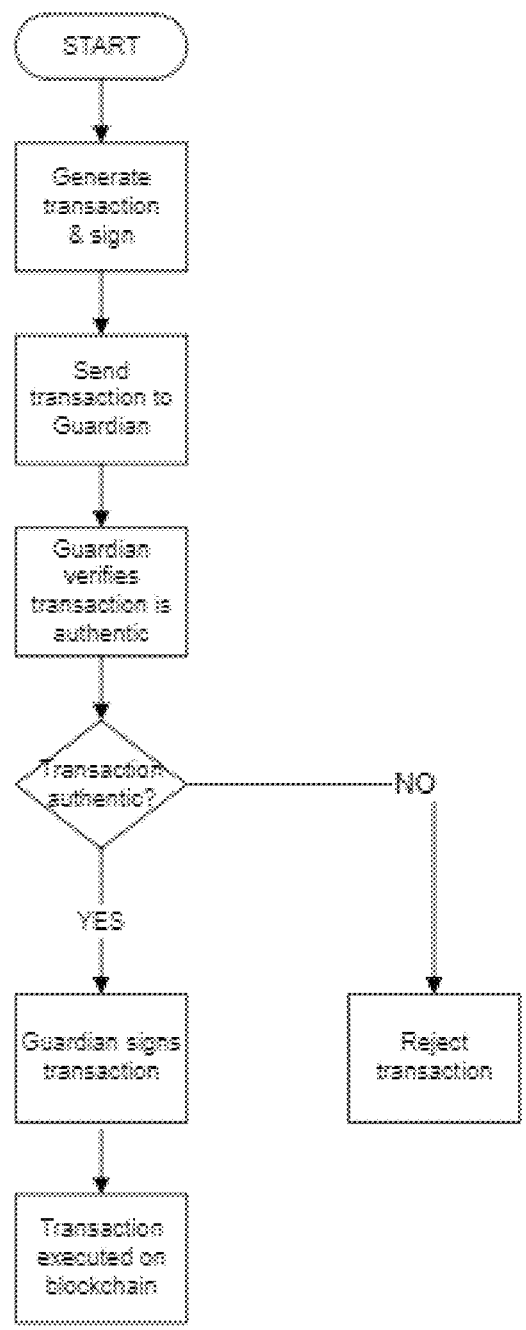
FIG. 5 is a flow chart showing a multi-signature process for executing a transaction.

The example below, setting out a sequence of consecutive steps, also shown in FIG. 5, illustrates how a Guardian can provide security through multi-signatures:

1) The owner of an account nominates a Guardian (or Guardians) to be the multi-signatories on their address;
2) When wishing to withdraw assets, the owner creates a transaction and signs it using their private key;
3) The transaction is then routed to the Guardian(s), who then use their own security systems, which may be separate from the blockchain system, to verify the authenticity of the transaction (a text message or a confirmation via their website for example);
4) Assuming the transaction is confirmed as being authentic, the Guardian(s) add their signatures to the transaction; and
5) The transaction is then executed once all signatures have been applied.

The above approach is considerably safer than a single private key since the single key cannot be used to enact transactions on its own.

The example below, again setting out a sequence of consecutive steps, illustrates how a bad actor who has stolen a private key is unable to complete a transaction:

1) A bad actor steals the private key to an address;
2) They create a fraudulent transaction and sign it using the stolen key;
3) The transaction is then routed to the Guardian(s) who establish, via their own security measures, that the transaction is fraudulent;
4) The address is frozen;
5) A new address is created, and the Guardian transfers the preferences of the old address to the new address (thus creating a different by identical address in terms of operation);
6) The assets from the frozen address are then transferred to the new address; and
7) The old address is marked as deleted with routing information to the new address (this is so existing contracts can be rerouted as well).

Mining

This is one of the most fundamental processes within a Blockchain and will be a requirement of every master node that operates on the system.

Ecosystem Monitoring

As with mining, monitoring of the eco-system is a fundamental process that has to be carried out and will be a requirement of every master node that operates on the system. The purpose of monitoring is continually 'audit' other master nodes to ensure that they are performing their duties and to ensure that the Guardians are for fulling their roles under the terms and conditions of their contract Dispute Resolution/Recovery of Assets A major issue affecting existing Blockchain solutions is the inability to cancel or reverse transactions. In the situation where a transaction is disputed (non-delivery of goods or a fraudulent transaction for example) then there is no recourse for the sender of an asset once it has been sent.

Figure 6:
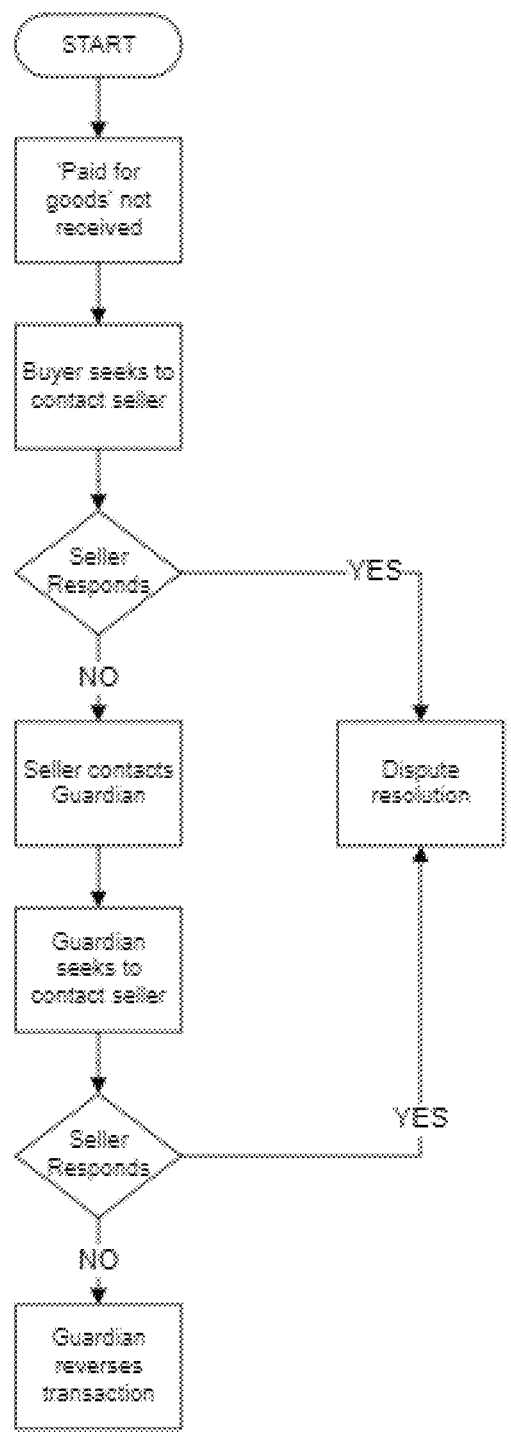
FIG. 6 is a flow chart showing a dispute resolution process.

Using a Guardian, a disputed transaction can be frozen and even reversed. It is also possible to trace assets and have them returned. The example below, again setting out a sequence of consecutive steps, shown also in FIG. 6, illustrates how this can be achieved:

1) The owner of an address transfers assets to another address as payment for goods;
2) The goods are never delivered!;
3) The address owner attempts to contact the other address holder but is unsuccessful;
4) The address owner now contacts the Guardian who freezes the assets; and
5) The Guardian now contacts the other address;
6) If no response is received, the transaction is reversed (no contest verdict); or
7) If the other address responds, then conflict resolution occurs in the same way as it would with any other financial dispute (a credit card for example).

Custodianship of Addresses

There are scenarios where the owner of an address may not wish to enter their KYC details and would prefer an address that is regulated, but anonymous. In this case a Guardian can provide their KYC information (by setting up the account themselves) and acting as proxy for the actual owner. The benefit of this is that the user can still use the address in the same way (via the private key) and be regulated but has an additional layer of abstraction.

Escrow Accounts

Guardians can provide escrow functions so that funds can be held by a neutral third party. An alternative approach that could be adopted, avoiding the needs for a neutral third party could be implemented using Smart Contracts.

Traditional Banking Functions

In some embodiments, Guardians will also be able to offer one or more 'traditional' banking functions to the owners of addresses on the Blockchain. These can include the following, for example:

1) Overdraft facilities;
2) Credit facilities (the same as a credit card);
3) Mortgages;
4) Investment opportunities; and
5) Exchange services.

Implementation of Processes

It will be understood that the processes described above can be implemented by computer program instructions. These program instructions may be provided to one or more processors to produce a machine, such that the instructions, which execute in the one or more processors, create means for implementing the steps in the processes.

It will also be understood that each process step, and combinations of process steps, can be implemented by special purpose hardware-based systems, which perform the specified actions or steps, or combinations of special purpose hardware and computer instructions.

Illustrated Operating Environment

Figure 7:
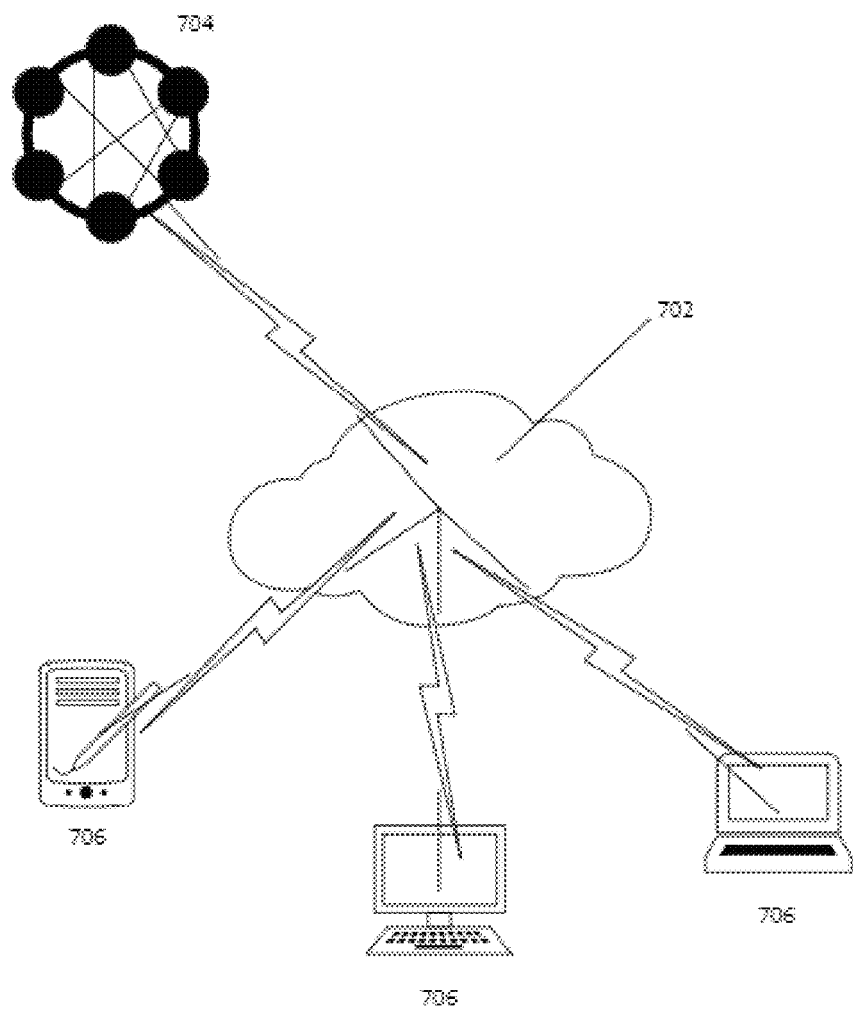
FIG. 7 shows an exemplary computer system comprising multiple network nodes and client devices in which a blockchain system incorporating embodiments of the present invention can be deployed.

FIG. 7 shows one embodiment of an exemplary environment in which various exemplary embodiments of the invention may be practiced. Not all of the components may be required to practice the invention, and variations in the arrangement and type of the components may be made without departing from the spirit or scope of the invention. As shown, the system of FIG. 7 includes network 702, a plurality of nodes 704, and multiple client devices 706.

A blockchain is stored at the nodes 704. A user can interact with the system using a blockchain application running on a client device 706, to create blockchain addresses (with embedded KYC information) and to execute transactions associated with their blockchain addresses, the transaction being recorded on the blockchain. One or more of the client devices 706 may also serve as nodes within the system.

Network 702 may be configured to couple network computers with other computing devices, including client devices 706. Network 702 may include various wired and/or wireless technologies for communicating with a remote device, such as, but not limited to, USB cable, Bluetooth®, Wi-Fi®, or the like. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or various combinations thereof. In various embodiments, network 702 may be enabled to employ various forms of communication technology, topology, computer-readable media, or the like, for communicating information from one electronic device to another. For example, network 702 can include—in addition to the Internet—LANs, WANs, Personal Area Networks (PANs), Campus Area Networks, Metropolitan Area Networks (MANs), direct communication connections (such as through a universal serial bus (USB) port), or the like, or various combinations thereof.

Illustrative Client Computer

Figure 8:
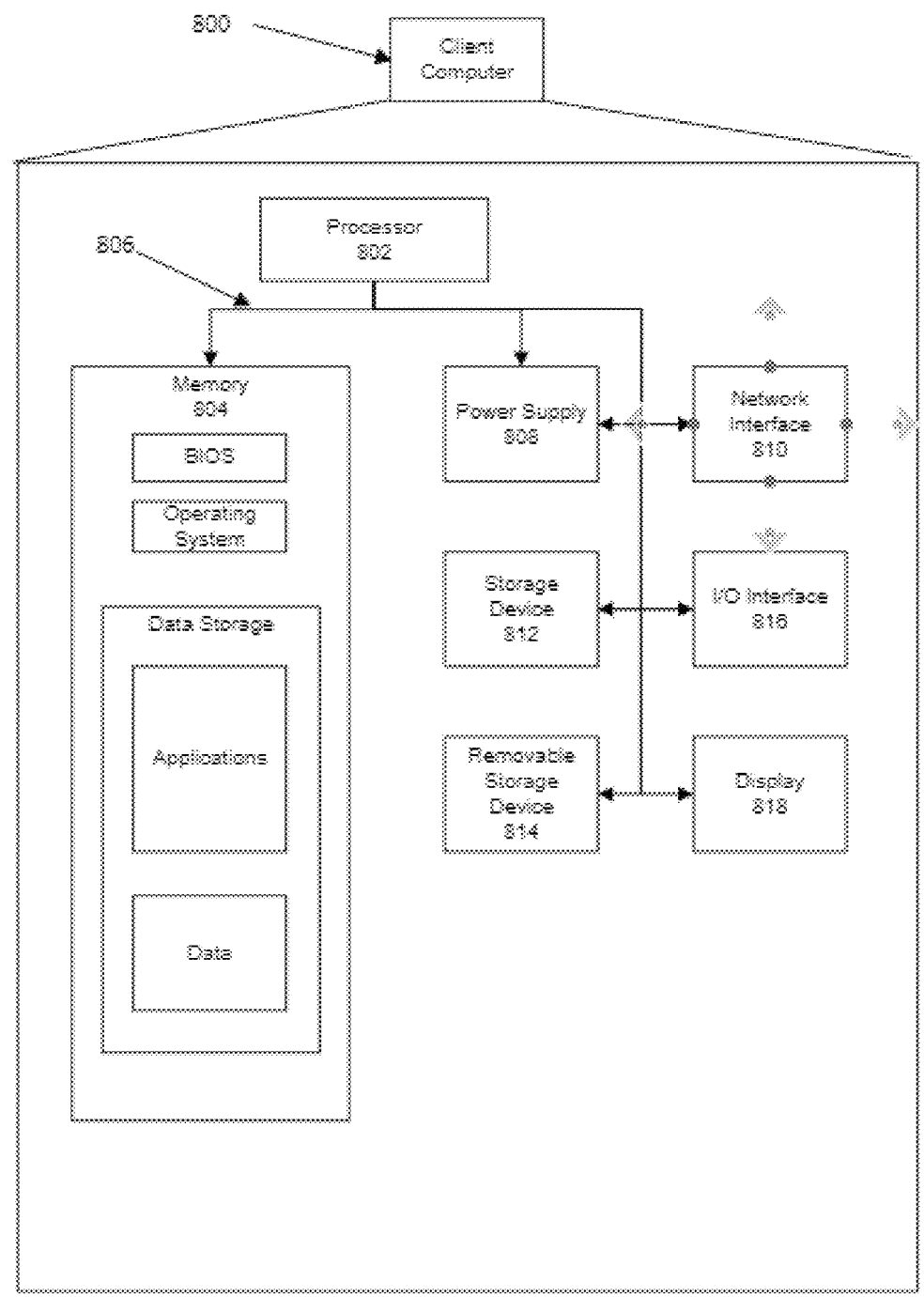
FIG. 8 shows one example of a client computer for operating as a client device in the system of FIG. 7.

FIG. 8 shows one embodiment of an exemplary client computer 800, which is included as a client device in a system such as shown in FIG. 7. Computer 800 may include many more or less components than those exemplary components shown. Client computer 800 may be a desktop computer, a laptop computer, a tablet computer or a smartphone, for example.

Computer 800 may include processor 802 in communication with memory 804 via bus 806. Client computer 800 may also include power supply 808, network interface 810, processor-readable stationary storage device 812, processor-readable removable storage device 814, input/output interface 816 and display 818.

Network interface 810 includes circuitry for coupling computer 800 to one or more networks, and is constructed for use with one or more communication protocols and technologies including, but not limited to, protocols and technologies that implement various portions of the OSI model for mobile communication (GSM), CDMA, time division multiple access (TDMA), UDP, TCP/IP, SMS, MMS, GPRS, WAP, UWB, Wi-Fi™, WiMax, Bluetooth™, SIP/RTP, GPRS, EDGE, WCDMA, LTE, UMTS, OFDM, CDMA2000, EV-DO, HSDPA, or various ones of a variety of other wireless communication protocols. Network interface 810 is sometimes known as a transceiver, transceiving device, or network interface card (NIC).

Display 818 may be optional and, when it is included, it may be a liquid crystal display (LCD), gas plasma, electronic ink, light emitting diode (LED), Organic LED (OLED) or various other types of light reflective or light transmissive displays that can be used with a computer. Display 818 may also include a touch interface arranged to receive input from an object such as a stylus or a digit from a human hand, and may use resistive, capacitive, surface acoustic wave (SAW), infrared, radar, or other technologies to sense touch and/or gestures.

Computer 800 may also comprise input/output interface 816 for communicating with external peripheral devices or other computers such as other client computers and network computers. The peripheral devices may include a keyboard, and a mouse or trackpad or other pointing device. Input/output interface 816 can utilize one or more technologies, such as Universal Serial Bus (USB), Infrared, Wi-Fi™, WiMax, Bluetooth™, and the like.

Memory 804 may include RAM, ROM, and/or other types of memory. Memory 804 illustrates an example of computer-readable storage media (devices) for storage of information such as computer-readable instructions, data structures, program modules or other data. Memory 804 may store BIOS for controlling low-level operation of client computer 800. The memory may also store operating system for controlling the operation of client computer 800. It will be appreciated that this component may include a general-purpose operating system such as a version of UNIX, or LINUX™, or a specialized client computer communication operating system such as Windows™, or the Apple iOS® operating system. The operating system may include, or interface with a Java virtual machine module that enables control of hardware components and/or operating system operations via Java application programs.

Memory 804 may further optionally include one or more data storage, which can be utilized by computer 800 to store, among other things, applications and/or other data. In one embodiment, at least some of data storage might also be stored on another optional component of computer 800, including, but not limited to, non-transitory processor-readable stationary storage device 812, processor-readable removable storage device 814, or even external to the client computer.

Applications may include computer executable instructions which, if executed by computer 800, transmit, receive, and/or otherwise process instructions and data. Applications may include, for example, a blockchain application for creating blockchain addresses and executing transactions that are recorded on the blockchain.

Illustrative Network Computer

Figure 9:
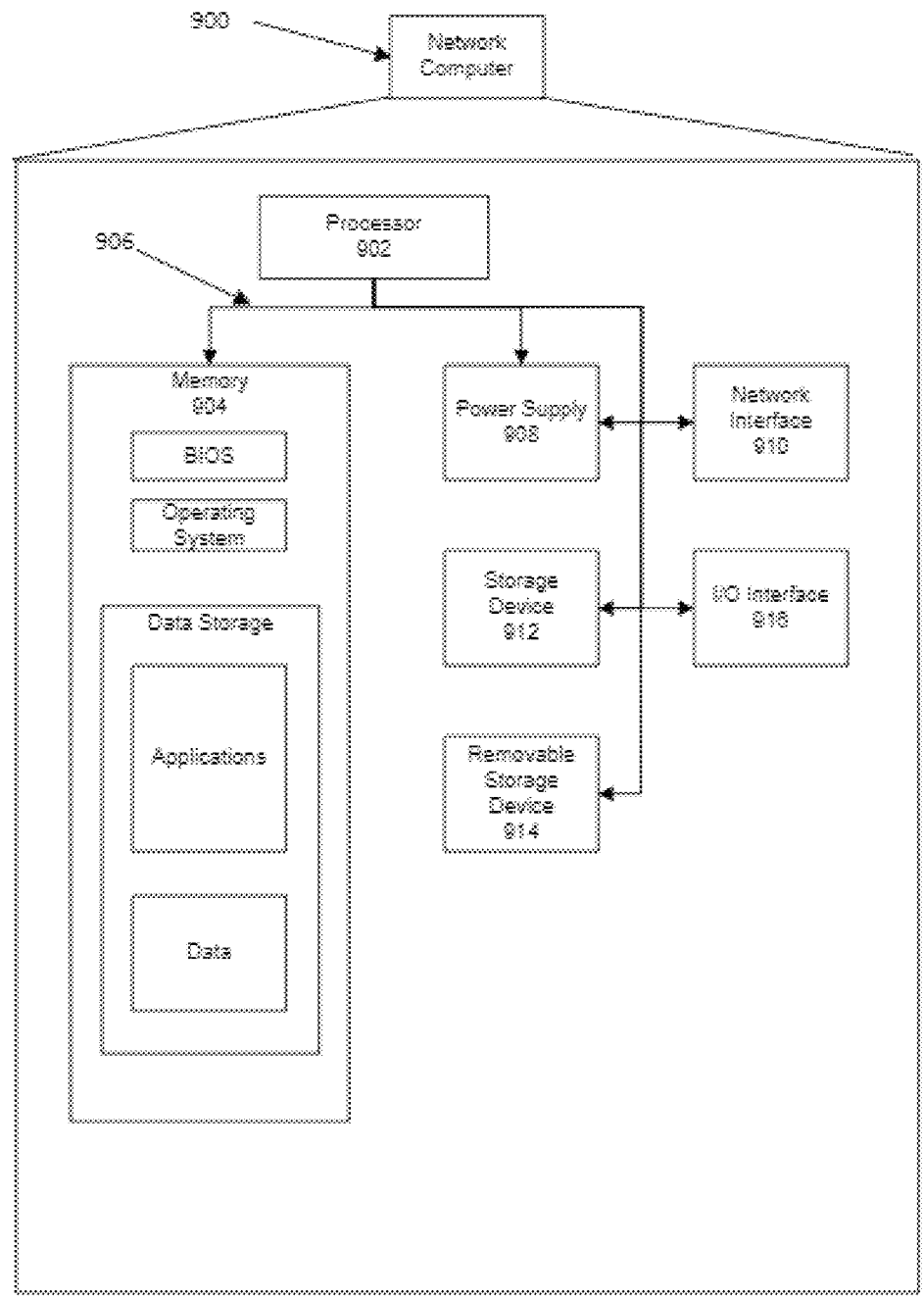
FIG. 9 shows one example of a computing or processing device for operating as a node in the system of FIG. 7.

FIG. 9 shows one embodiment of an exemplary network computer 900 that may be included in an exemplary system implementing one or more of the various embodiments. Network computer 900 may include some, all, or more components than those shown in FIG. 9. Network computer 900 may include a desktop computer, a laptop computer, a tablet computer, a server computer, a client computer, and the like. Network computer 900 may represent one embodiment of node 706 of system 700 of FIG. 7.

As shown in FIG. 9, network computer 900 includes processor 902 that may be in communication with memory 904 via bus 906. In some embodiments, processor 902 may be comprised of one or more hardware processors, or one or more processor cores. In some cases, one or more of the one or more processors may be specialized processors designed to perform one or more specialized actions, such as, those described herein. Network computer 900 also includes a power supply 908, network interface 910, processor-readable stationary storage device 912, processor-readable removable storage device 914, and input/output interface 916.

Network interface 910 includes circuitry for coupling network computer 900 to one or more networks, and is constructed for use with one or more communication protocols and technologies including, but not limited to, protocols and technologies that implement various portions of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or various ones of a variety of other wired and wireless communication protocols. Network interface 910 is sometimes known as a transceiver, transceiving device, or network interface card (NIC).

Network computer 900 may also comprise input/output interface 916 for communicating with external devices or computers not shown in FIG. 9. Input/output interface 916 can utilize one or more wired or wireless communication technologies, such as USB™, Firewire™, Wi-Fi™, WiMax, Thunderbolt™, Infrared, Bluetooth™, Zigbee™ serial port, parallel port, and the like.

Memory 904 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 904 stores a basic input/output system (BIOS) for controlling low-level operation of network computer 900. The memory also stores an operating system for controlling the operation of network computer 900. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 904 may further include one or more data storage, which can be utilized by network computer 900 to store, among other things, applications and/or other data. Data storage may include program code, data, algorithms, and the like, for use by one or more processors, such as processor 902 to execute and perform actions such as those actions described above in the operation of the blockchain. In one embodiment, at least some of data storage might also be stored on another component of network computer 900, including, but not limited to, non-transitory media inside non-transitory processor-readable stationary storage device 912, processor-readable removable storage device 914, or various other computer-readable storage devices within network computer 900, or even external to network computer 900.

In one or more of the various embodiments, one or more of the applications may be implemented as modules and/or components of another application. Further, in one or more of the various embodiments, applications may be implemented as operating system extensions, modules, plugins, or the like.

Also, in one or more of the various embodiments, the nodes of the sys may be located in virtual servers running in a cloud-based computing environment rather than being tied to one or more specific physical network computers.

The invention claimed is:

1. A computer-based method for generating a transaction within a blockchain system for transferring ownership of an asset to a receiving party, the method comprising:
    receiving a blockchain address to which ownership of the digital asset is to be transferred, the blockchain address having identification information for an owner of the blockchain address embedded therein, the identification information including Know Your Customer (KYC) information;
    decoding the blockchain address to extract the identification information using a public key, the blockchain address being generated based on a cryptographic hash of the public key and a combination of the identification information and a salt field;
    confirming whether the identification information identifies the receiving party, thereby confirming whether the receiving party is the owner of the blockchain address;
    if the identification information identifies the receiving party, generating a transaction including the received blockchain address and a record of the asset whose ownership is to be transferred; and
    signing the transaction with a private key of a blockchain address from which the asset is to be transferred;
    wherein the owner of the blockchain address from which the asset is to be transferred has previously nominated a Guardian as a second signatory for the blockchain address,
    wherein the method comprises, following signing of the transaction with the private key, routing the signed transaction to the Guardian and the Guardian applying a Guardian signature to the transaction, the transaction only being executed once signed by the Guardian;
    wherein in the case where the authenticity of the transaction is not verified, the transaction is indicated to be fraudulent and the blockchain address from which the asset is to be transferred is frozen; and
    wherein the method further comprises creating a new blockchain address including identification information for the owner of the frozen blockchain address and then transferring assets from the frozen blockchain address to the new blockchain address.

2. The method of claim 1, wherein the signed transaction is broadcast to a blockchain network for inclusion in a block for validation and, once validated, appended to the blockchain.

3. The method of claim 1, wherein the blockchain address is signed with the Guardian signature, the method comprising checking that the Guardian signature is a valid signature of a trusted Guardian and only proceeding with the transaction if the Guardian signature is valid.

4. The method of claim 1, wherein before applying the Guardian signature, the Guardian verifies the authenticity of the transaction.

5. The method of claim 4, wherein verifying the authenticity of the transaction comprises the Guardian communicating with the owner of the blockchain address from which the asset is to be transferred, the communication being via a communication channel separate from the blockchain system.

6. The method of claim 1, wherein the KYC information comprises a user name.

7. The method of claim 1, further comprising:
    imposing a fee on the transaction, the fee being a fee type selected from one of a fee exemption, a flat fee, and a percentage of a value of the transaction;
    wherein the fee type is selected based on a transaction type.

* * * * *